US 6,712,282 B2

(12) United States Patent
Eberspach et al.

(10) Patent No.: US 6,712,282 B2
(45) Date of Patent: Mar. 30, 2004

(54) FLUID DELIVERY DEVICE, PARTICULARLY FOR DELIVERY OF COMBUSTION AIR TO A HEATING BURNER OF A MOTOR VEHICLE

(75) Inventors: Günter Eberspach, Wolfschlugen (DE); Walter Blaschke, Deizisau (DE); Dieter Götz, Kirchheim/Teck (DE)

(73) Assignee: J. Eberspacher GmbH & Co., Esslingen (DE)

( * ) Notice: Subject to any disclaimer, the term of this patent is extended or adjusted under 35 U.S.C. 154(b) by 187 days.

(21) Appl. No.: 10/084,268

(22) Filed: Feb. 24, 2002

(65) Prior Publication Data

US 2002/0119408 A1 Aug. 29, 2002

(30) Foreign Application Priority Data

Feb. 27, 2001 (DE) .......................................... 101 09 412

(51) Int. Cl.[7] .................................................. B60H 1/02
(52) U.S. Cl. .................................... 237/12.3 C; 165/41
(58) Field of Search ....................... 237/12.3 C, 12.3 R, 237/12.3 B; 165/41, 42

(56) References Cited

U.S. PATENT DOCUMENTS

| 3,942,719 A | * | 3/1976 | Blomberg .............. 237/12.3 C |
| 5,480,093 A | * | 1/1996 | Tochizawa et al. .... 237/12.3 C |
| 5,738,506 A | * | 4/1998 | Mosig et al. ................. 431/90 |
| 6,082,625 A | * | 7/2000 | Faccone et al. ........ 237/12.3 C |

* cited by examiner

Primary Examiner—Derek Boles

(57) ABSTRACT

A fluid delivery device, in particular for the delivery of combustion air to a heating burner of a motor vehicle or for the delivery of heating medium, preferably heating air, through a heating medium duct system of a motor vehicle, comprises a delivery member which can be driven to rotate by a drive, a rotary state monitoring arrangement for monitoring the rotary state of the delivery member, and also an operating state sensing arrangement for determining the operating state of a system to be supplied with fluid by the fluid delivery device, based on the monitoring result of the rotary state monitoring arrangement.

21 Claims, 4 Drawing Sheets

FLUID DELIVERY DEVICE, PARTICULARLY FOR DELIVERY OF COMBUSTION AIR TO A HEATING BURNER OF A MOTOR VEHICLE

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a fluid delivery device, particularly for delivery of combustion air to a heating burner of a motor vehicle and/or for the delivery of heating medium, preferably heating air, through a heating medium duct system of a motor vehicle.

TECHNICAL FIELD

In modern motor vehicles, heating units are increasingly used in order to heat air, for example, when the drive assembly is not running or in addition to the drive assembly, and to supply this heated air to the passenger space or to the driver's cabin. Such heating devices or supplementary heaters in general have a heating burner in which a fuel, which in general corresponds to the fuel to be burned in the motor vehicle drive assembly, is burned together with supplied combustion air. The resulting heat is transferred to a medium, for example, air or water, circulating in a heat exchange region of the heating burner. The combustion air and also that air or that medium to which the heat is transferred is in general delivered by blowers, pumps, or fans to the heating burner or into the heat exchange region.

In such systems it is of importance to sense the present operating state of the system region to be supplied with the medium to be delivered. For example, in the region of the heating burner it is of importance to sense whether or not combustion is taking place there. In known systems this takes place by temperature sensing of the components thermally affected during the combustion, or for example by optical sensing of a combustion chamber. Whereas the temperature sensing of thermally affected components is a comparatively sluggish measurement method, optical temperature sensing entails problems to the effect that, for example, an optical fiber has to be sealingly conducted into a combustion chamber and that the sensing is furthermore influenced by possible deposits of dirt particles in the region of the sensor.

It is also advantageous to sense whether there is present a possible damming up, for example, intentional or unintentional blockage, of the duct system.

SUMMARY OF THE INVENTION

The present invention therefore has as its object to provide a fluid delivery device for delivering a fluid to a system to be supplied with the fluid or respectively, a process for characterizing the operating state of such a system, by means of which the present operating state of this system or the change of the operating state can be concluded in a simple and reliable manner.

According to a first aspect of the present invention, this object is attained by a fluid delivery device, in particular for the delivery of combustion air to a heating burner of a motor vehicle or for the delivery of heating medium, preferably heating air, through a heating medium duct system of a motor vehicle, comprising a delivery member which can be driven to rotate by a drive, a rotary state monitoring arrangement for monitoring the rotary state of the delivery member, and also an operating state sensing arrangement for sensing the operating state of a system to be supplied with fluid by the fluid delivery device, based on the monitoring result of the rotary state monitoring arrangement.

The present invention is based on the knowledge that changes in the operating state of a system supplied with a fluid in general have effects on the flow state of the fluid flowing through this system. Thus for example the fact whether or not combustion is taking place in a heating burner has as a consequence that when combustion is taking place, a markedly higher pressure drop will be present, due to the thermally conditioned expansion of gases present in the combustion chamber, between this system region and that region into which the exhaust gases then emerge, than in a state in which no combustion is taking place. A higher pressure drop however means that the delivery device or the respective delivery member itself has to work against a higher pressure. This however influences the rotary state of this delivery member or requires changes in the operating characteristic of the drive for the delivery member for the maintenance of a given predetermined rotary state. According to the invention, the rotary state of the delivery member is now monitored so that, based on this monitoring result, possibly a changed operating state of the drive of the delivery member, for example, the change of a drive signal, can have as a consequence that statements can be made about the operating state of the system supplied with the delivered fluid. For example, if the rpm of the delivery member falls when the operating state is unchanged, i.e., for example with unchanged control of the drive, this is thus an indication that an increase of the flow resistance has occurred in the downstream duct system. In the case of a heating burner, it can thus be concluded that this has ignited.

For example, it can be provided that the drive in the device according to the invention is an electric motor drive, that a control element is allocated to the electric motor drive and emits to the electric motor drive a control signal characterized by at least one control value and based on the monitoring result, and that the operating state determining arrangement determines the operating state of the system based on the control values and/or a time change of the same. In this aspect of the present invention, a value which occurs anyway in normal operation is thus evaluated for the characterization or sensing of the operating state of the system to be supplied with fluid. Thus no additional constructional measures are required on such a system such as the provision of sensors or the like.

For example, it can be provided that the operating state determining arrangement senses the presence of a given operating state when the control value, and/or the time course of it, reaches a predetermined threshold value. The control value can be, for example, a mark/space ratio of an electrical quantity, which can for example be the applied voltage, supplied to the electric motor drive.

In an alternative embodiment as already mentioned hereinabove, it can be provided, for example, that the operating state determining arrangement senses the operating state based on the rpm of the delivery member or a value related thereto, or the time change of the same.

The present invention is furthermore concerned with a heating system, particularly for a motor vehicle, in which a fluid delivery device according to the invention is provided for the delivery of combustion gas, preferably combustion air, to the combustion chamber of a heating burner, and/or a fluid delivery device according to the invention is provided for the delivery of a heating medium, preferably heating air, by means of a heating medium duct system.

According to a further aspect of the present invention, the object stated hereinabove is attained by a process for the characterization of the operating state of a system to be supplied with a fluid, preferably gas, wherein the fluid delivery device includes a delivery member which can be driven to rotate, comprising the following steps: producing a rpm value reproducing the rpm of the delivery member, monitoring the rpm value, recovery of information characterizing the operating state of the system, based on the rpm value and/or a related control value for a drive of the delivery member.

As already stated hereinabove, the operating state of the system supplied with fluid, or a change of the operating state, can thus be concluded from monitoring the value reproducing the rpm of the delivery member according to the principles of the present invention.

For example, it can be provided that the control value reproduces a mark/space ratio of an electrical quantity supplied to an electric motor drive of the delivery member. This quantity can be, for example, the voltage applied to the electric motor drive.

When using electric motor drives in combustion air delivery systems of heating burners, e.g., supplementary heaters in motor vehicles, the procedure is in general that the rpm of the delivery member is kept to a substantially constant value by means of a corresponding control loop. This value is set such that while combustion is taking place and the flow resistance for the supplied gas resulting in a known manner is set to the desired or required volume flow (=fluid volume passing through per unit time through a given channel section). In such a system it can then be provided, according to an advantageous aspect of the present invention, that for obtaining a predetermined rpm of the delivery member, the mark/space ratio is set to a variable mark/space ratio value, and that the presence or occurrence of a given operating state of the system is sensed when the mark/space ratio, and/or a time rate of change of the same, reaches a predetermined threshold.

The procedure according to the invention can particularly find application when the system comprises a flow duct system, preferably a heating air duct system, and when the operation of the flow duct system is characterized as to whether and/or to what extent a flow medium passage through the flow duct is prevented. Furthermore, particularly preferably, the use of such a procedure is possible when the system comprises an heating burner, preferably in a motor vehicle, when the fluid comprises gas, preferably combustion air, and when the operating state of the heating burner is characterized as to whether and/or to what extent a combustion is taking place.

BRIEF DESCRIPTION OF THE DRAWINGS

The present invention is described in detail hereinafter using preferred embodiments, with reference to the accompanying drawings.

DETAILED DESCRIPTION OF THE INVENTION

Figure 1:
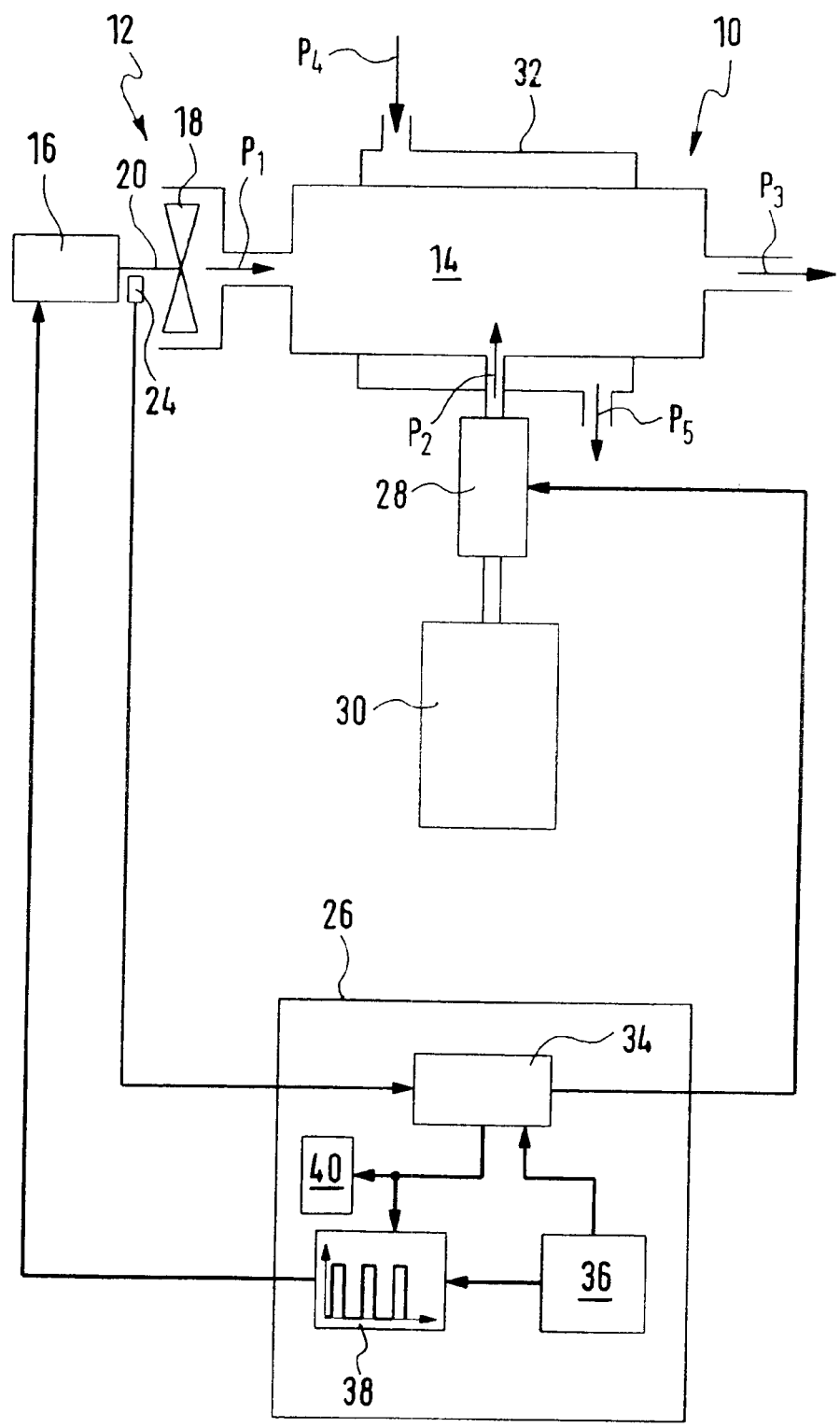
FIG. 1 shows a block diagram of a fluid delivery device used in connection with a heating burner in a motor vehicle.

An overall system is shown in FIG. 1, using which the principles of the present invention are shown. This overall system includes a heating burner generally denoted by 10, as can for example find application as the auxiliary heater or supplementary heater in a motor vehicle. A combustion air blower denoted by 12 is allocated to this heating burner 10, and air required for combustion is delivered by means of it, as denoted by an arrow $P_1$, into a combustion chamber 14 of the heating burner 10. The blower 12 comprises a fan wheel 18 which can be driven to rotate by an electric motor 16. The rpm of this fan wheel 18, or of a shaft 20 carrying this, is sensed by a rpm sensor 24, as further described hereinafter, conducted to a control device 26, and evaluated in this.

A metering pump device 28 is furthermore allocated to the heating burner 10, and by means of it fuel contained in a fuel tank 30 is conducted (arrow $P_2$) in a defined, metered manner into the combustion chamber 14. A glow plug, for example, present in the combustion chamber 14 ignites the fuel introduced, for example, in an atomized manner and brings it to combustion with the oxygen contained in the supplied combustion air. The combustion exhaust gases are discharged to the exterior, as indicated by an arrow $P_3$, via an exhaust gas duct system (not shown in detail), if necessary with a catalyst.

A heat exchange region 32 is furthermore allocated to the heating burner 10. This heat exchange region 32 has a heated fluid, for example, heating air or else water, flowing through it, as shown by the arrows $P_4$ and $P_5$. The heat produced by the combustion in the combustion chamber 14 and first contained in the combustion products is then partially transferred to this fluid or medium to be heated. In the case of heating air, this can then, for example, be fed directly into a passenger compartment of a motor vehicle. If water is made use of as the medium, this can then transfer its heat in a second heat exchanger to heating air, which can then be fed into the passenger space.

The electric motor 16 and the metering pump device 28 are under the control of the control device 26. This produces corresponding control instructions, for example in a control region 34 for the metering pump device 28. For example, it is possible that in the case of an electromagnetically excited metering pump device 28 for electrical voltages supplied by a voltage source 36 to be applied in a timed manner by the control region 34 to one or more magnetic coils of the metering pump device 28, in order to then introduce fuel into the combustion chamber 14 corresponding to the mark/space ratio and also to the timing frequency by means of the metering pump device 28, as indicated by the arrow $P_2$.

Likewise in the case of the metering pump device 28, the control region 34 can also control or regulate the operation of the electric motor 16. To obtain correct combustion in the combustion chamber 14, it is necessary to introduce an amount of combustion air by means of the blower 12, allocated quantitatively in a correct manner to the introduced amount of fuel. This means that blower 12 must be constituted so as to maintain a predetermined volume flow (combustion air volume introduced into the combustion chamber 14 per unit time) in combustion operation. Here also the procedure can be that a voltage of predetermined magnitude is applied to the electric motor 16 in a timed manner. This can be recognized, for example, using FIG. 3. It can be seen there that the timed voltage is applied with a voltage value of $U_v$ with a cycle period length D and a pulse width $I_1$, so that at first a mark/space ratio of $I_1/D$ results. In order to maintain this, a corresponding switching region 38 can be controlled by the control region 34 and can apply the voltage supplied by the voltage source 36 in a timed manner, for example, with a frequency in the range of 16–20 kHz.

The electrical power to be supplied to the electric motor 16 depends on various operating parameters and can be ultimately reproduced by the following quantity:

$$V \times \Delta p / \eta \tag{1}$$

Here V corresponds to the volume flow of the combustion air, $\Delta p$ substantially corresponds to the counterpressure built up in the heating burner 10 and against which the blower 12 has to deliver, and is thus a measure of the flow resistance present in the heating burner 10 or in the downstream duct components. The quantity $\eta$ reproduces the efficiency of the blower 10; of course, the efficiency of the electric motor 16 also enters into this quantity.

Figure 2:
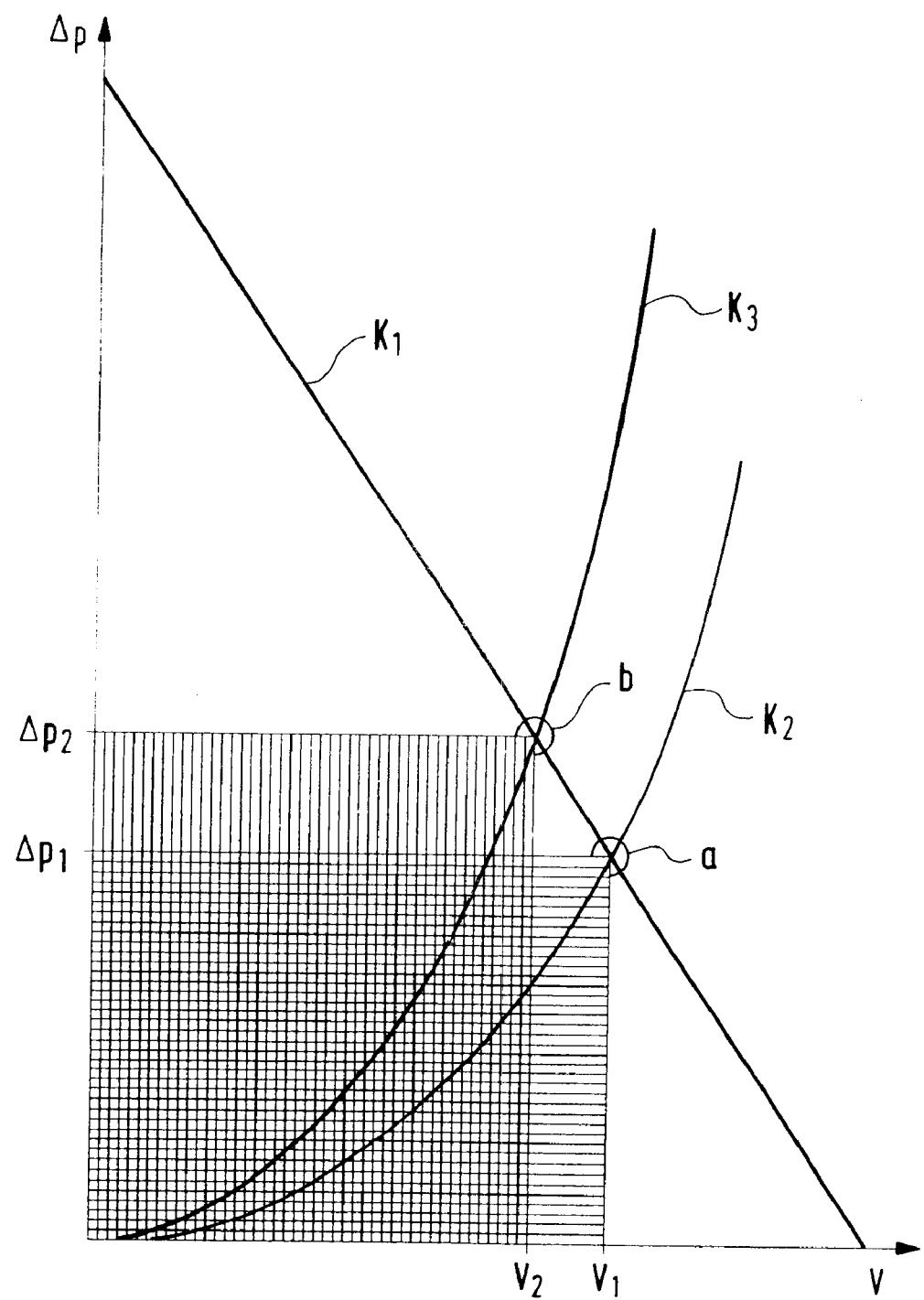
FIG. 2 shows the volume—counterpressure characteristic line for the heating burner shown in FIG. 1 and resulting at a constant rpm of a delivery member.

FIG. 2 shows a characteristic line $K_1$ which for a constant rpm value reproduces the connection between the volume flow V and counterpressure, and thus the flow resistance, $\Delta p$. It can be seen that the volume flow decreases with increasing counterpressure $\Delta p$ at constant rpm. This relationship which can be taken from the characteristic line $K_1$ is used according to the principles of the present invention to characterize the operating state of the heating burner 10.

Let it first be assumed that the heating burner 10 is just set in operation, i.e., no combustion is yet taking place in the combustion chamber 14. The combustion air introduced into the combustion chamber 14 by the blower 12 flows through this combustion chamber 14 and the exhaust gas duct system adjoining downstream. Thus for this special flow system there results a characteristic line $K_2$ characterizing the flow resistance for a state without combustion. This characteristic line $K_2$ ultimately gives the flow resistance for the combustion air introduced into, or flowing through, the heating burner 10 for different rpms and thus for different flow speeds. For a specific predetermined rpm, which is also allocated to the characteristic line $K_1$, there then results a point of intersection, present in the circle a, between the two characteristic lines $K_1$ and $K_2$ as the working point of the overall system. This means that a volume flow $V_1$ is set based on the preponderating counterpressure or flow resistance $\Delta p_1$.

If the fuel introduced into the combustion chamber 14 of the heating burner 10 is now ignited and the desired combustion reaction takes place, this also leads, because of the marked temperature rise, to a considerable expansion of the combustion products, i.e., the combustion gases, in the combustion chamber 14 and flowing downstream from this. This means that a markedly higher pressure—measured with respect to the ambient pressure—will arise in the combustion chamber 14 and the downstream duct system, and ultimately corresponds to a markedly increased counterpressure against which the blower 12 now has to deliver. This operating state in which combustion takes place in the combustion chamber 14 now has a displaced flow resistance characteristic line $K_3$ allocated to it. A new intersection point, now in the circle b, of the characteristic lines $K_1$ and $K_3$ results, assuming the rpm kept constant. This means that the working point of the system has been displaced, and at a counterpressure or flow resistance $\Delta p_2$, which clearly lies above the value $\Delta p_1$ present without combustion, a reduced volume flow $V_2$ now occurs.

Figure 3:
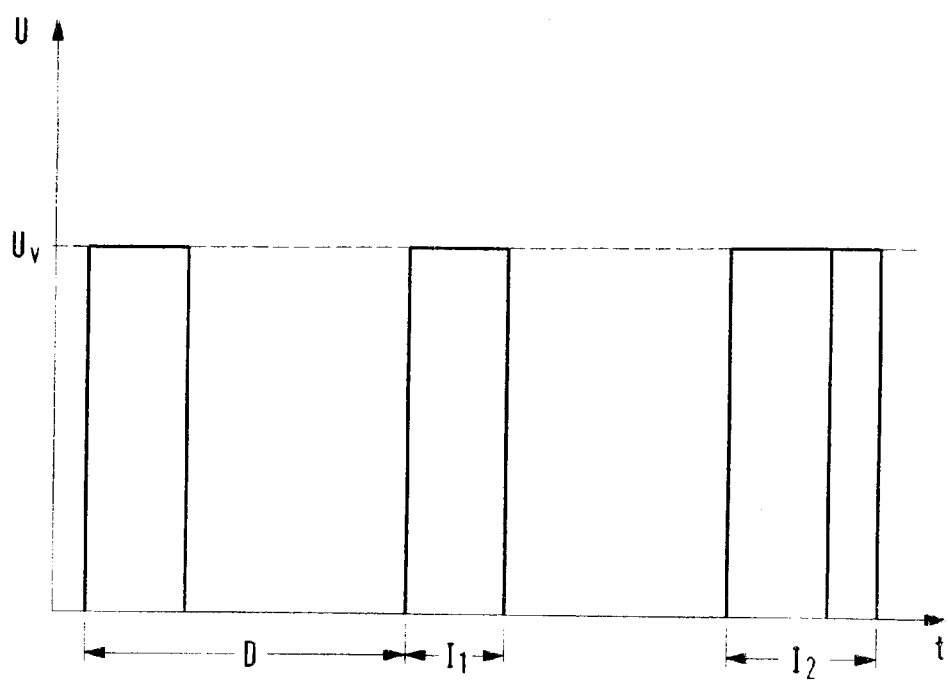
FIG. 3 shows the time course of a control signal for the electric motor drive of the fluid delivery device of FIG. 1.

The shaded rectangles in FIG. 2 with side lengths $\Delta p_1$, $V_1$ or $\Delta p_2$, $V_2$ are a measure of the electric power to be supplied to the electric motor 16, as can be gathered from the formula (1) given hereinabove. It can be seen that the electric power delivered in the case of combustion is greater than the electric power delivered when combustion is not present. Thus in order to be able to keep the rpm of the electric motor 16 constant, account has to be taken of this higher required electric power, in that, as can be seen in FIG. 3, the mark/space ratio is changed. For this purpose, there is now a transition from pulse duration $I_1$ to pulse duration $I_2$, the period duration D however basically remaining maintained.

The transition to operation with increased pulse duration $I_2$ can take place in the form of a regulating process. If combustion takes place in the heating burner 10 or in its combustion chamber 14, this is thus a more or less continuous transition, which is reflected again in a reduction of the rpm of the blower 12 because of the gradually rising counterpressure $\Delta p$. This is however sensed by the rpm sensor 24 or by the control region 34, and in the form of a control loop, the electrical power of the electric motor 16 is increased by the corresponding output from the control region 34 to the switching region 36 of a signal representing an adjusted mark/space ratio. It should be mentioned here that the speed of the fan wheel 18, to be kept constant by suitable measures by means of the control device 26, is determined such that, for the case of correct combustion and the thus ultimately set counterpressure or flow resistance $\Delta p$, the required amount of combustion air is fed into the combustion chamber 14. This means that in the state in which combustion is not yet present, at the same rpm a greater amount of combustion air or a greater volume flow of the combustion air is conducted into the combustion chamber 14.

The quantity which represents the mark/space ratio T and which is produced in the control region 34 based on the output of the rpm sensor 24, i.e., ultimately also based on the present rpm or the rpm changes of the fan wheel 18, is monitored in a monitoring region 40 of the control device 26. For this purpose, the quantity representing the mark/space ratio T can be compared in the monitoring region 40 with one or more threshold values. This is described hereinafter using FIG. 4.

Let it first be assumed that the system is set in operation at the time $t_0$, and a voltage with the mark/space ratio $T_1$ is applied to the electric motor 16 by a corresponding output from the control region 34. The mixture of fuel and combustion air present in the combustion chamber 14 begins to ignite at the time $t_1$, with the result that the counterpressure $\Delta p$ now gradually rises. The rising counterpressure becomes evident in a fall of the rpm of the fan wheel 18. However, account is taken of this, as already described hereinabove, by a corresponding increase of the mark/space ratio T. i.e., the output of a correspondingly adjusted signal from the control region 34 to the switching region 38. This can also be seen in FIG. 4 where, beginning at the time $t_1$, the mark/space ratio T also begins to rise, starting from the value $T_1$. At the time $t_2$, the mark/space ratio value has reached a threshold $S_{T1}$. This is sensed in the monitoring region 40, and it can for example then be concluded from it that substantially correct combustion is proceeding in the combustion chamber 14. After the time $t_2$, the counterpressure $\Delta p$ still rises slightly until time $t_3$ due to still slightly changing combustion relationships, resulting in a corresponding slight change of the mark/space ratio to a value $T_2$. Correct combustion takes place in the phase between times $t_3$ and $t_4$, so that ultimately no change occurs, either in the counterpressure $\Delta p$ or in the mark/space ratio T. At the time $t_4$, the system is shut off, and the combustion at first taking place in the combustion chamber 14 gradually extinguishes. The flow resistance, i.e. the counterpressure $\Delta p$ present in the system, then of course also decreases, with the consequence that without counter-regulation the rpm of the fan wheel 18 would rise. Account is again taken of this, however, by changing the mark/space ratio T toward a reduction of the pulse time duration, so that the mark/space ratio $T_4$ decreases again from the time $t_4$. If a further threshold value $S_{T2}$ is then reached at the time $t_5$, it can be concluded from this that combustion is substantially no longer taking place in the combustion chamber 14, and the heating burner 10 is out of action. The combustion relationships or flow relationships change only slightly from time $t_5$ to time $t_6$, until ultimately the mark/space ratio $T_1$ is again reached at time $t_6$, as is required to hold the constant rpm of the fan wheel 18 ready when combustion is not present. At this mark/space ratio $T_1$, the blower 12 can for example still be controlled for a predetermined period, in order to blow out the residual combustion gases still present in the combustion chamber 14. By means of reaching the respective threshold value $S_{T1}$ or $S_{T2}$, the operating state of the heating burner 10 can thus be concluded, taking into account whether the mark/space ratio T rises or falls: i.e., whether and to what extent combustion is taking place. On reaching this threshold value, the monitoring region 40 can for example supply a corresponding signal characterizing the operating state of the heating burner. If this signal denotes, for example, that no combustion is present, but however at the same time the metering pump device 28 is operated in order to deliver fuel into the combustion chamber 14, this can be an indication that, for example, no more fuel is present in the fuel tank 30, or that no combustion is taking place because of other circumstances or defects. This can lead to the production of a corresponding warning, or to the shutdown of the overall system.

Figure 4:
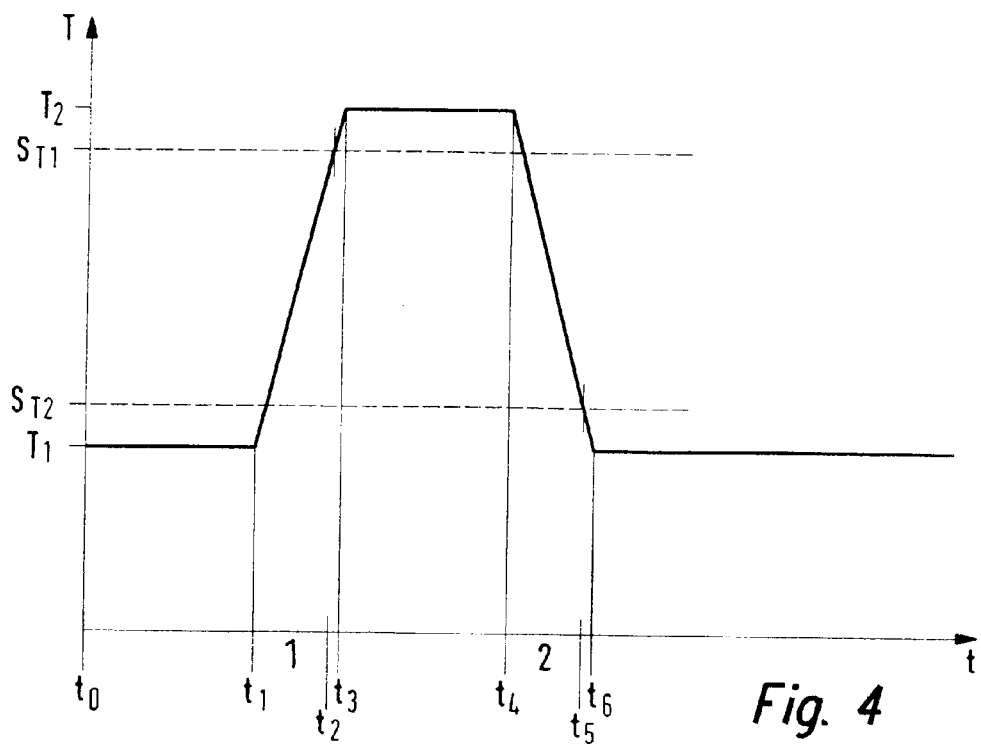
FIG. 4 shows the change with time of the mark/space ratio of the control signal of FIG. 3 during the transition between a combustion state and a non-combustion state of the heating burner of FIG. 1.

The evaluation of the absolute value of the mark/space ratio T is shown in FIG. 4. This is a procedure which can take place above all for systems in which the change of the operating state, thus for example the transition from a state without combustion to a state with combustion, entails relatively large changes in this absolute value of the mark/space ratio T. Since, however, system-specific constructional quantities and manufacturing tolerances are also reflected in the absolute value of the mark/space ratio, it can be advantageous to evaluate, not the absolute value, but the time change, i.e., the gradient, of the mark/space ratio. The evaluation then ultimately runs exactly as described hereinabove, wherein in the example shown in FIG. 4, in phase 1, in which the transition takes place from non-combusting to combusting state, a positive gradient shows the transition from the non-combusting state to the combusting state, while in phase 2 a negative gradient shows the occurrence of combustion. Here also, corresponding threshold values can be set for the gradient, and are then compared in the monitoring region 40 with the gradients actually present, in the manner previously described, and thus contribute to the production of the information characterizing the operating state of the heating burner.

Figure 5:
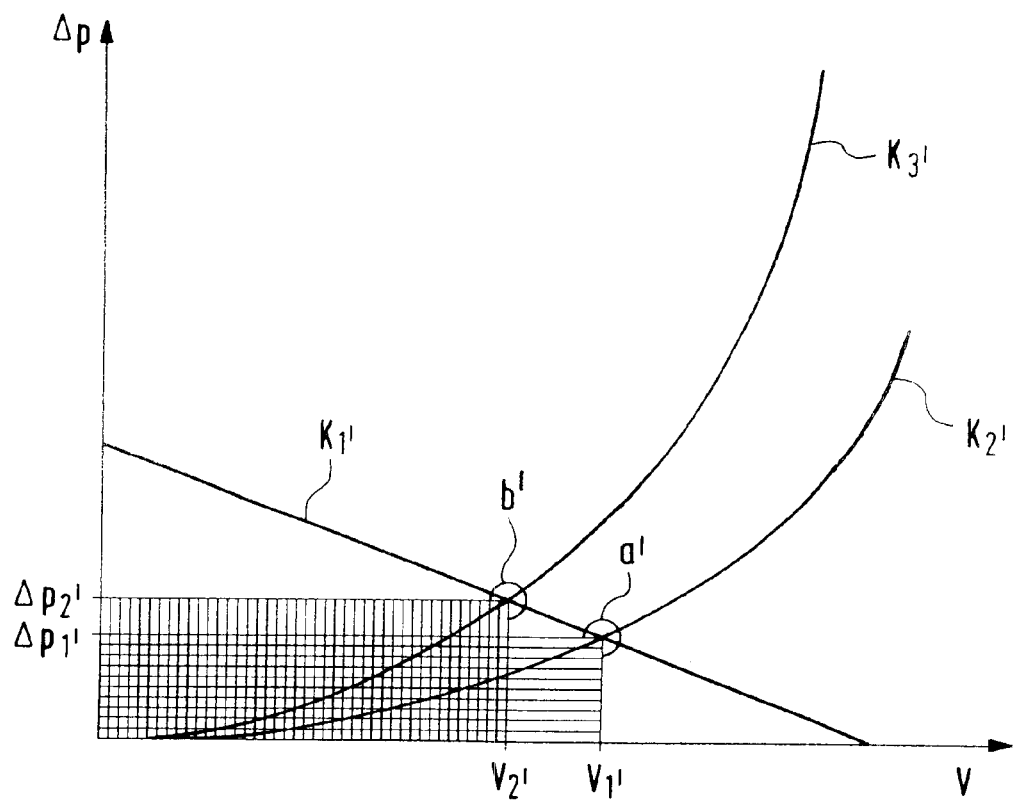
FIG. 5 shows a diagram corresponding to FIG. 2, and reproduces the volume flow—counterpressure characteristic for a heating air duct system in a motor vehicle.

The particularly preferred application region of the principles of the present invention, for monitoring the flame state of a heating burner, such as can find application, for example, in motor vehicles, has been described hereinabove. However, these principles can be applied to any system in which a fluid is delivered through a duct system by a fluid delivery arrangement, thus for example the blower 12 shown in FIG. 1. A change in the flow resistance in this duct system has an effect on the rpm of the fluid delivery arrangement or of the delivery member. This change of rpm can either be made use of directly as an indicator for the changing flow relationships, i.e. the rpm could ultimately be compared directly in the monitoring region with corresponding threshold values, instead of the evaluation described hereinabove of a quantity which is connected to the rpm, i.e. is produced based on this. For example, the procedure according to the invention can also be used in the monitoring of the duct system for the heating medium flowing through the heat exchanger region 32, thus for example the heating air. This is illustrated using the diagram of FIG. 5. Here also, similarly to that in FIG. 2, a characteristic line $K_1'$ is shown which shows the connection of the volume flow V to the counterpressure $\Delta p$, for the blower for heating air or the heating air duct system at a predetermined rpm. Furthermore, a characteristic line $K_2'$ is again present for the state of orderly throughflow, so that the operating point of the system for orderly functioning can again be detected using the intersection point present in the circle a'.

If however the flow resistance changes, for example due to intentional or unintentional damming up of the duct system, the characteristic line $K_2'$ now shifts to a characteristic line $K_3'$ with the consequence that a new operating point is obtained in the circle b'. A correspondingly smaller volume flow $V_2'$ occurs due to the higher counterpressure $\Delta p_2'$. In this case also, the supplied electric power changes, so that to maintain the rpm for example the mark/space ratio is changed in turn. Here also, the mark/space ratio or its change with time can again be monitored, in order ultimately to acquire characterizing information for the operating state of the system in which the heating air is delivered, and thus of the heating air duct system. Here also, however, with unchanged control of the blower for the heating air, a change in the flow characteristic could be sensed by means of the changing of the rpm.

The principle according to the invention of sensing a change in the operating state of a system supplied with fluid by monitoring the rpm of a fluid delivery member or of a quantity produced in connection with this or based on this as regards its absolute value or its change with time, can also be used in any system in which a fluid is to be delivered, the fluid not necessarily being gaseous. Also in the delivery of liquid by means of corresponding vane wheels, changes in the flow resistance of the duct system situated downstream of such a vane wheel have an effect on the rotary state of the fan wheel, and thus induce a change of its rpm or require a corresponding change of control to maintain the rpm. It should furthermore be mentioned that particularly due to the fact that the rpm can also be directly evaluated, the principles of the present invention can also find application to systems in which a delivery member is driven in rotation in a manner other than by an electric motor. This means that even when no quantity characterizing or influencing a control signal is available for evaluation, which can be the case, for example, when a delivery member is driven by an internal combustion engine, a change or the flow relationships which affects the state of rotation of a delivery member can be sensed by monitoring this state of rotation.

We claim:

1. A fluid delivery device, comprising:
   a delivery member (18) that can be driven to rotate by a drive (16),
   a rotary state monitoring arrangement (34, 40) for monitoring a rotary state of the delivery member (18), and
   an operating state sensing arrangement (40) for determining an operating state of a system (10) to be supplied with fluid by the fluid delivery device, based on a monitoring result of the rotary state monitoring arrangement (40).

2. The fluid delivery device according to claim 1, wherein the drive (16) comprises an electric motor drive (16), a control device (26) is allocated to the electric motor drive (16) and outputs a control signal characterized by at least one control quantity (T) based on the monitoring result at the electric motor drive (16), and the operating state sensing arrangement (40) senses the operating state of the system based on the control quantity (T) or on its change with time.

3. The fluid delivery device according to claim 2, wherein the operating state sensing arrangement (40) senses the presence of a given operating state when the control quantity (T) or its change with time reaches a predetermined threshold value ($S_{T1}$, $S_{T2}$).

4. The fluid delivery device according to claim 2, wherein the control quantity (T) reproduces a mark/space ratio (T) of an electrical quantity supplied to the electric motor drive (16).

5. The fluid delivery device according to claim 4, wherein the electrical quantity comprises a voltage applied to the electric motor drive (16).

6. The fluid delivery device according to claim 1, wherein the operating state sensing arrangement (40) senses the operating state based on an rpm of the delivery member (18) or on its change with time.

7. A heating device comprising a fluid delivery device (12) according to claim 1 for delivery of combustion gas to a combustion chamber (14) of a heating burner (10).

8. A heating device for a motor vehicle comprising a fluid delivery device (12) according to claim 1 for delivery of heating medium through a heating medium duct system.

9. A process for characterization of an operating state of a system (10) to be supplied with a fluid by a fluid delivery device (12), wherein the fluid delivery device (12) comprises a delivery member (18) which can be driven to rotate, comprising the steps of:
   (a) producing a rpm quantity reproducing an rpm of the delivery member (18),
   (b) monitoring the rpm quantity,
   (c) based on the rpm quantity or on a therewith connected control quantity for a drive (16) with the delivery member (18), recovering information characterizing the operating state of the system.

10. The process according to claim 9, wherein the control quantity reproduces a mark/space ratio (T) of an electrical quantity supplied to an electric motor drive (16) of the delivery member (18).

11. The process according to claim 10, wherein the electrical quantity comprises a voltage applied to the electric motor drive (16).

12. Process according to claim 9, wherein to obtain a predetermined rpm of the delivery member, the mark/space ratio (T) is set to a variable mark/space ratio value, and when the mark/space ratio value or its time rate of change reaches a predetermined threshold ($S_{T1}$, $S_{T2}$), the presence of a given operating state of the system (10) is sensed.

13. Process according to claim 9, wherein the system comprises a flow duct system, and operation of the flow duct system is characterized as to whether, and to what extent, the passage of flow medium through the flow duct system is hindered.

14. Process according to claim 9, wherein the system (10) comprises a heating burner (10) in a motor vehicle; the fluid comprises gas, and an operating state of the heating burner (10) is characterized as to whether or to what extent combustion is taking place.

15. The fluid delivery device according to claim 1, for delivery of combustion air to a heating burner of a motor vehicle or for delivery of heating medium through a heating medium duct system of a motor vehicle.

16. The fluid delivery device according to claim 15, wherein the heating medium comprises heating air.

17. A heating device according to claim 7, wherein the combustion gas comprises combustion air.

18. A heating device according to claim 8, wherein the heating medium comprises heating air.

19. A heating device according to claim 7, for a motor vehicle.

20. The process according to claim 9, wherein the fluid comprises gas.

21. The process according to claim 14, wherein the gas comprises combustion air.

* * * * *